Patented Aug. 15, 1944

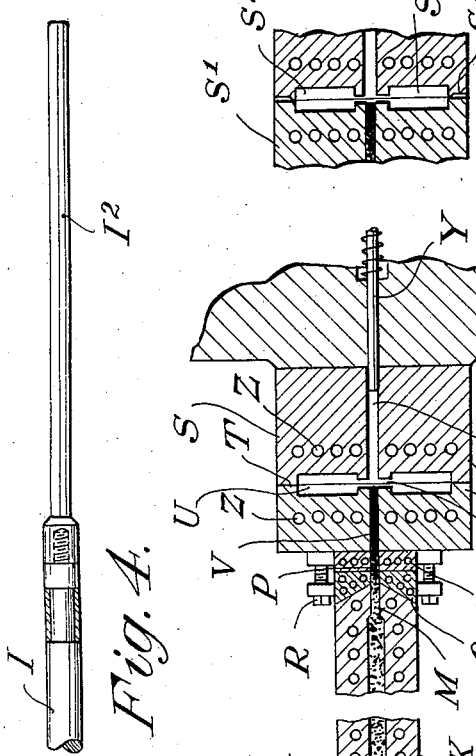
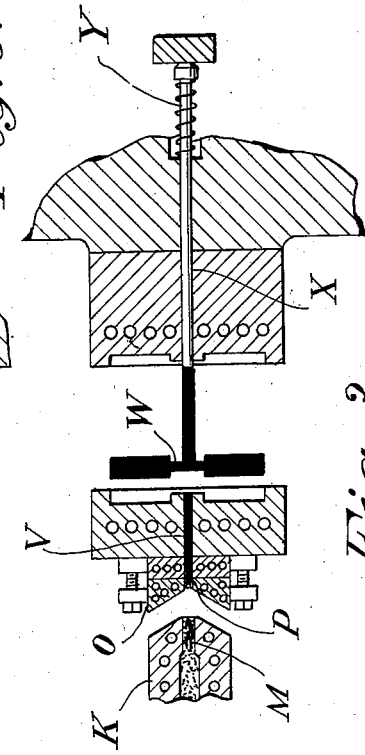
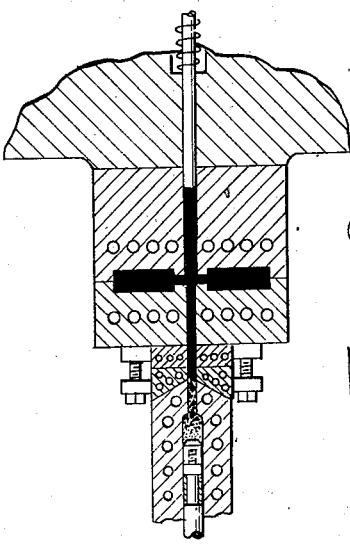

2,356,081

UNITED STATES PATENT OFFICE 2,356,081

INJECTION METHOD OF MOLDING THERMOSETTTING MATERIAL

Emil E. Novotny, Philadelphia, Pa., assignor to Durite Plastics, Incorporated, Philadelphia, Pa., a corporation of Pennsylvania Application February 8, 1940, Serial No. 317,811

16 Claims. (Cl. 18—55)

This invention relates to a method of molding thermosetting materials by injection.

The method briefly comprises the steps of plasticizing by heat the molding powder or granules while moving the same in a thin continuous stream, delivering such plasticized material to the loading well or hopper of an injection cylinder or pressure chamber, maintaining the molding material in this plastic condition within the loading well and the pressure chamber and the orifice leading therefrom, forcing or extruding the same through an orifice in a superheating block where there is imparted to the material a sufficient amount of heat and where an exothermic reaction is initiated, the superheated material being forced therefrom into the mold which latter is heated at a lower temperature than the superheating block to prevent burning and charring of the molded piece, the mold giving form and mold finish and preventing undue cooling of the heated material, the molded piece then being ejected from the mold while retaining sufficient exothermic heat to cure after ejection to its final ultimate form.

By my method the pressure chamber need be only large enough to take care of the molding requirements of a single mold cavity charge; the plunger of the pressure chamber may be relatively of small diameter to provide a high unit pressure. This unit pressure is only necessary to provide injection motion and need not be maintained during the period of cure, since pressure within the mold cavity is maintained by the curing of the thermosetting material within the orifice of the superheating block. As the mold is only formative and provides a set film on the molded piece of no great depth at the surface of the mold cavity, the formed or molded piece is not cured therein, but may be immediately ejected from the mold after the setting of a surface film. A relatively high per diem production may be obtained from a single mold cavity, as the pieces need not be cured nor cooled, as industrially understood, therein.

While injection molding has been practiced heretofore on thermosetting materials, such practice has been confined almost exclusively to the production of large or complicated pieces having a relatively low per diem requirement, or to pieces where the design of the part is such that it would be difficult to mold satisfactorily by the usual compression method of molding. This has been so because thermosetting materials, such as synthetic resins, require a definite cure and this slows down the molding cycle to such an appreciable extent that it is more economical in the molding of pieces of ordinary design to use multiple cavities and the compression method.

On the contrary, great strides have been made in the molding of thermoplastic materials, particularly cellulose acetate, as this product has a rather definite softening or plasticity temperature, and in the pressure chamber the product is heated only to this point of plasticity and is then forced into heated and/or cooled mold cavities where only a slight temperature drop sets the pieces to sufficient rigidity to be ejected quickly from the cavity. If one of the steps in the molding of these thermoplastics called for a cure under conditions of heat and pressure within the mold, then the operation would be slowed up so materially as to be ordinarily non-competitive with multiple cavity compression molding.

Thermosetting materials, however, set up at temperatures below their temperature of optimum plasticity and therefore cannot be held at this temperature for a commercial length of time without becoming substantially non-flowing. The products, furthermore, are poor heat conducting mediums and therefore absorb heat in thin films, particularly when not compressed, and when compresed to provide a solid body the products react exothermically at a higher rate of speed than when not compressed. It is therefore advantageous to induce plasticity prior to compression, and it is equally advantageous to maintain this optimum plasticity by retaining the absorbed plasticizing heat therein. When fully compressed and forced through a relatively small orifice in a zone of high temperature the materials rapidly take on heat sufficient to carry the exothermic reaction to completion as ejected from such high temperature zone, and if such ejected parts are not allowed to cool materially until the exothermic reaction has been substantially completed. On this basis, therefore, it is possible to provide an ejection molding method and an apparatus offering advantages in speed to the molding of cellulose acetate where a substantial through-cooling is called for. In my method the mold cavity provides the formative means and the surface finish; and the material is thereupon ejected without cooling, a condition economically advantageous in point of time as compared to the speed of cellulose acetate molding.

My earliest work in injection molding of phenolformaldehyde synthetic resins appears in my U. S. Patent 1,319,107, filed December 18, 1916, issued October 21, 1919. In this patent, compounds of Bakelite or Condensite type were used, such compound being permitted to be heated on a steam table or hot plate to soften the material, and this was then placed into a pressure chamber and a relatively large plunger forced the material through orifices into a hinged and locked cylindrical form mold cavity. The pressure chamber was detachably mounted on the mold, was heated thereby, and sufficient heat was provided to set the material in the mold to its final ultimate infusible form. The mold cavity was also provided with restricted outlets to prevent the building up of excessive pressure within the mold cavity. The unit was used primarily in the molding of printing plates having a more or less endless design, and reproduced with fidelity the regularities of the printing face and the irregularities of the non-printing surface. The method and apparatus was primarily designed for the handling of a single molding of a part which would have been most difficult to mold by ordinary compression methods. The method, however, would not be used in competition with ordinary multiple cavity compression molding methods, but was admirably suited for the molding of parts which could not be molded except with great difficulty by means of the compression method.

In my U. S. Patent 1,993,942, filed February 16, 1929, issued March 12, 1935, an injection method and apparatus is shown which functions automatically for a number of repeat moldings. This apparatus, likewise, calls for the cure within the mold and therefore was not intended as a method competitively advantageous over the then existing method of compression molding, but was likewise designed for the purpose of molding certain particular work which it would have been difficult to mold by such compression methods. In this apparatus the pressure chamber is utilized for the purpose of plasticizing, the pressure chamber must be heated to a relatively high temperature to quickly plasticize materials coming into contact with the surface of such temperature, and therefore the temperature therein is not merely the temperature required to obtain optimum plasticizing conditions, but a maintained temperature high enough to force a sufficient quantity of plasticized material into the mold cavity without undue loss of time. That is, in the operation of this unit the material flows only as rapidly as it is plasticized; and being a poor conductor of heat plasticizing occurs from surface contact with the heated pressure chamber and therefore maximum velocity through the injection orifice is not merely the result of size of the orifice, its resistance and pressure applied. Therefore mold cavities by this method are filled more slowly than need be. In order, furthermore, to carry a sufficient amount of material the pressure chamber must be of relatively large diameter and/or cumbersomely long, and therefore it is difficult to provide high pressures to assist in the rapid flow of material and keep within reasonable thicknesses of side walls of the pressure chamber and the construction of the pressure producing source such as the operating ram.

The method of my present invention offers distinct advantages in the rapid molding of thermosetting compositions, some of the characteristics being as follows:

1. The method comprises feeding continuously a quantity of thermosetting material to a heating conveyor, whereby a thin layer of probably $\frac{1}{32}$ to $\frac{1}{8}$ in. thickness of rather uniformly ground granular material is heated to its optimum plasticizing temperature. This heating is done in relative small quantities continuously and in relatively thin films, and is preferably fed over a corrugated surface, thus causing the particles to mix and rotate and acquire a uniform temperature throughout.

The plasticizing temperature cannot be definitely given as this will vary with various types of molding compositions. Various phenol-aldehyde, urea-aldehyde, etc. resins have various plasticizing temperatures and consideration must be given the temperature required for plasticizing. There may of necessity be a closely adjusted balance between the material needs as to plasticization and cure and the temperatures used, being guided likewise by the decomposition temperature of the material intended for use. Considering, however, one type of resinous material containing cashew nut shell oil as the reacting phenolic body, an optimum plasticizing temperature of approximately 200° F. is advantageous. At the temperature of 200° F. this product, known as Durite S-2208, for a period of six minutes will maintain a flow of 93% (Durite Plastics' flow standards), at a unit pressure of 10,000 lbs./sq. in. When the material is heated for a period of ten minutes the flow under these conditions is only 88%; at the end of fifteen minutes it is 76.4%; at the end of thirty minutes 15.4%; and at the end of one hour 8.2%. While this product may be heated to plasticize to a temperature of 250° F. and even higher, the duration of such plasticity will be greatly decreased. With higher unit pressures a greater velocity may be obtained. At reduced pressures the velocity is decreased and therefore a correspondingly longer time is required to inject a given quantity of material into a mold cavity. Therefore it will be noted that the promotion of plasticity is a function of temperature and that plasticizing temperature duration must be considered in conjunction with the type of work done and the velocity of pressure used in injecting the material into the mold cavity.

2. The material plasticized in its loose granular form is fed to the loading well or hopper of the pressure chamber or injection cylinder and the hopper and cylinder are heated to prevent undue cooling of the plasticized material to a temperature below the plasticity required for the production of particular parts. It is to be understood, of course, that even elevating the temperature within the pressure chamber is not objectionable should there be a drop in the temperature of the composition, for instance held in the loading well or if for other reasons. The temperature, however, should not be so high as to prematurely initiate exothermic reaction to the point of setting up the material to infusibility within the pressure chamber. Specifically, working with Durite S-2208 the temperature of the molding powder issuing from the heating conveyor, stored in the loading well, and transferred to the pressure chamber should be substantially uniform, and at preferably about 200° F. with a maximum of not to exceed 250° F. Of course, if the pressure chamber material is being rapidly ejected the precaution here is to maintain the temperature to eliminate burning, charring, discoloration or a premature set condition. However, if the apparatus should be held idle and the temperature of the pressure chamber should be high, then a special ejector should be placed on the plunger to force all of the material positively out of the chamber to prevent clogging. Where the material in the pressure chamber is maintained at approximately 200° F. and a unit pressure of 10,000 lbs./sq. in. is available, it has been found the material in the pressure chamber would flow, where Durite S-2208 is used, even after holding a charge therein for a period of one hour, as during the lunch period.

3. The now plasticized material is forced through an orifice within the superheating block, this block having an adjustable mounting on the mold itself. This superheating block may be heated at varying temperatures, the temperatures being so adjusted that the material feeding through its channel will acquire a temperature sufficiently high so that not only an exothermic reaction ensues, but that sufficient heat is stored up in the material to carry the reaction through to infusibility. This superheating block, heated to various temperatures, may be heated to a somewhat lower temperature at the orifice leading from the pressure chamber so as to minimize the effect of conducted heat from the superheating block to the pressure chamber orifice. If the pressure chamber at the orifice end is heated efficiently with hot water or atmospheric steam and pressure is not allowed to build up, the temperature of this orifice may readily be maintained at the boiling point of water. The temperature requirement of this superheating block is dependent upon the length of such orifice in the block, the velocity of the material being fed through such orifice the temperature tolerance of the material being fed and the heat needed to provide infusibility through the cure outside the mold cavity. With Durite S-2208 the material in the orifice would be heated to a temperature of from 400° to 650° F., depending on the type of filler used. Ordinarily the superheater block is to be heated from 500° to 1000° F. when utilizing a material such as Durite S-2208 and for that matter most phenol-aldehyde molding compositions. The superheating block can be built up in sections; certain sections may be at higher temperatures than other to provide a product heated sufficiently to permit of final cure without requiring a long heating in the mold cavity. The superheating block may be electrically heated to provide a temperature sufficiently high to provide a high heat transfer rate due to a high heat potential differential. However, as stated, the block may merely be heated with atmospheric steam in a section bearing against the extrusion cylinder orifice, preferably with steam at atmospheric pressure, or with hot water, to thereby absorb the surplus heat of the highly heated portion of the superheating block and remove the same in the form of latent heat of vaporization, thereby maintaining the temperature of required plasticity within the pressure chamber orifice. Details of manipulation will be readily apparent to those familiar with the molding of thermosetting resinous compositions and their temperature tolerances.

4. With the first molding piece this superheated plastic material enters the mold cavities by means of well known gates (but first fills an infusible plug cavity which communicates with the mold cavities). The product is formed in the mold, and at the reduced temperature of the mold the material forming the surface is rapidly cooled to the surface temperature of the mold cavity which, however, is sufficiently high to provide an instantaneous surface set cure giving finish and form. This external cure insulates the heat within the molded piece. The moldings are then ejected while hot into a suitable container or device for further curing. During this molding operation certain material sets to infusibility within the orifices of the superheating block and the mold, and with the second molding operation such infusible material is forced into the cavity provided for the infusible plug, and this infusible material is then ejected with such subsequent molded piece.

5. It should be noted that so soon as the mold has been filled and the motion of the plastic material has ceased that the material in the superheating block channel or orifice is set to infusibility, locking the pressure within the mold cavity. The plunger of the pressure chamber may be withdrawn for a preferred distance or a distance sufficient to provide a new charge of material (the single shot operation is much to be preferred, but several moldings from one pressure cylinder is not precluded) and simultaneously the superheating block may be pulled away from communication with the pressure chamber orifice, and continuing of the stroke will cause ejection of the piece and the ejection of the previously formed infusible gate.

A description of the accompanying drawing, all of which is in schematic cross section, is made herein for a better understanding of my invention.

Figure 1 is an elevational view, in section, illustrating an injection unit comprising the essential steps of my invention. In this illustration the mold cavity is closed, the superheating block is in position, the pressure chamber is receiving additional material and is now ready for the forward stroke to force a measured quantity of plasticized material into the mold cavity.

Figure 2 is a view showing the mold cavity closed and filled, with the superheating block still against the pressure chamber orifice;

Figure 3 is a view likewise in cross section showing the mold open, the superheater block removed from the pressure chamber orifice and the piece with the previously formed gate integrally attached thereto being ejected from the mold cavity to be permitted to cure in a box, basket or other suitable means;

Figure 4 is an elevation, partly in cross section, of a plunger having attached thereto a suitable ejector which may be used therewith in maintaining the discharge orifice clear during the molding operation; and Figure 5 is a view of a modified mold.

Referring now more in detail to the drawing, Figure 1 diagrammatically illustrates the operation of a suitable molding press which may be used to practice the process of my invention. A is a main feed hopper which holds any quantity of a granular molding compound, provided with a gate G, the said feed hopper being supported above a heated conveyor B. Molding compound C issues from the hopper A and travels over the heated conveyor B. The heated conveyor B has a heating surface D which may be smooth, but preferably is corrugated or fluted as shown. The purpose of the corrugations is to thoroughly mix and bring all particles of the granular molding compound into equally close proximity to the heated surface. E represents a known type of vibrating means of high frequency which is made a part of the conveyor itself. (Such a vibrating equipment is manufactured by the Jeffery Manufacturing Company of Columbus, Ohio.) The frequency of the vibrator E employed is such that the material may be fed at a definite and constant rate of speed and may be maintained in a disturbed vibratory condition so there is no adhering contact of the molding compound C with the heating surface D. While the conveyor B is indicated as traveling in a downwardly direction, this vibratory principle may be utilized to deliver the material either over a horizontal or upwardly inclined surface. The heating means is indicated at N, and this together with the vibration and rate of feed is so adjusted as to provide a material of optimum heat plasticized condition emptying into hopper H.

Where Durite S–2208 is used, the rate of feed to the conveyor should be such as to plasticize the product, at the rate of delivery needed, to a temperature of between 200° and 250° F. The corrugations D may be of highly polished material and where infra-red lamps mounted on cover F provided with a suitable reflector are used as supplementary heating it is preferable to have the reflector and the heating surfaces of the conveyor plated with polished gold, for example, which will reflect most of the heat rays into and through the molding composition. As to the capacity of the conveyor, usually one of 12 in. width with a length of from 2 to 10 ft. may be used, depending upon the amount of material required and the facilities used for heating. Under ordinary molding conditions one cubic foot or 40 pounds of molding compound per hour, utilizing a cellulosic filler, would be used. A conveyor ordinarily of 2 ft. length will serve the purpose quite well, the temperature of heating being manipulated under thermostatic control to deliver the product at the plasticizing temperature.

The loading well or pressure chamber hopper indicated at H is provided with heating means conventionally shown at N. This serves as a reservoir to collect an amount of material, and maintain the same at uniform temperatures, in a quantity sufficient for the next injection load. This hopper H may be provided with stirring devices, gates or measuring devices to check the measured feed of the conveyor and thus provide a definite portion of material for each charge. Such devices are well known and are not shown.

The plunger for the pressure chamber is indicated at I—J. The plunger is likewise provided with a self-packing annular ring to obviate the necessity of providing a close fitting plunger and as this plunger matches up in contour with the farthest end of the pressure chamber cavity, to permit the forcing out of any excess material should they remain idle or for some other reason, it is desirable that the plunger limiting collar or other device be closely adjacent to prevent abnormal pressure of metal to metal at the far end of the operating stroke. Material is dropping in measured quantity from the loading well H into pressure chamber cavity L in readiness for the next injection stroke. The pressure chamber as an entirety is shown at K, the orifice thereof at M, and the heating means, again conventionally, is shown at N. It is to be understood that this heating means is purely optional and that with proper insulation and proper initial heating through use it is generally possible to dispense with heating altogether, the precaution being to maintain the molding compound C at its optimum plasticized condition throughout the cavity L and the orifice M. The heating means here, as in the case of the heated conveyor B, could be electric, with the exception that at the orifice M, where, if any heating means is used, it should preferably be of such a nature as to act more as a cooling medium, and thus hot water or atmospheric steam could be used, which would then prevent a temperature rise much beyond the boiling point of water or much beyond the temperature of the molding compound C.

At O the superheating block is shown. A number of sections may be provided, two being shown. The function of this superheating block is to impart a sufficiently high temperature to a relatively thin stream of injected material traveling through the block orifice P as to provide sufficient heating to initiate exothermic reaction and to provide a sufficient amount of heat within the composition, this to permit the material to be cured through such absorbed heat and heat of reaction after having been formed in the mold. Heating means Q for the superheating block O is only conventionally shown, and the block is intended to be heated to a high temperature which would be difficult to attain through the use of ordinary steam pressures available, and therefore electric heating is recommended, with a sufficient wattage input to heat at least the latter end of the plug to a relatively high temperature in the order of from 600° to 1000° F. The part of the plug adjacent to the pressure chamber orifice may be heated with atmospheric steam if a supersensitive material is used to prevent the transmission of too much heat to the pressure chamber at this point. However, with adequate removal of heat at the pressure chamber orifice this may be dispensed with, and particularly so if the mold cavity is quickly filled and the superheating block O is quickly withdrawn from the pressure chamber orifice, as indicated in Fig. 3. The pressure chamber block sections are assembled and mounted on the mold or mold block by means of a suitable mounting means such as indicated by means of bolts R. This mounting may be on merely the rectangular surface of a mold block or mold, or the mold may be shaped with sufficient material removed to permit the assembly of the superheating block O more closely adjacent to the mold cavity gates. This superheating block, furthermore, is made adjustable so that the cavity or feed channel may be provided of any reasonable length by means of bolting on additional units or removing units from the assembly.

The mold itself is indicated as an entirety at S, the separating or parting line thereof at T and the cavities at U. The orifice for filling the mold is indicated at V. The material within orifice V shown in Figure 1 has lost its superheat and is not to be used together with the set material in orifice P in the next molding, but upon pressure being applied by plunger I this infusible material will be forced into the cavity indicated at X, in position for ejection by the ejector Y when this material will be attached to the next molded piece, as is indicated in Fig. 3.

Figure 2 shows a closed mold cavity with the material injected therein. In this condition the mold is allowed to momentarily dwell to give form and surface finish to the molded part.

In Figure 3 superheating block O has been withdrawn from the pressure chamber K and orifice thereof M. There is infusible material in orifices P and V which upon the next subsequent molding will be forced into the cavity X. The material from the previous molding in cavity X is now attached to mold gate W and is being ejected by means of the ejector Y. The molded pieces now ejected are permitted to carry through their final cure without cooling, as in a suitable container or other device.

Should there be any danger of setting the material within the pressure chamber orifice and partially within the pressure chamber walls to a hard set condition after the machine has stood idle for an unusual length of time, the material, while still plastic, may readily be ejected from the pressure chamber cavity L and orifice M by means of a supplementary ejector I² which may be placed on the plunger I, as shown in Fig. 4. The use of such ejector is optional as other means may be utilized, as by the ejection of certain thermoplastic material or by forcing the infusible material out of the orifice and out of the pressure chamber cavity L.

Figure 5 shows a modification of the mold S, indicated here as S¹; S¹, S² being the cavities thereof and S³ being restricted flow orifices to permit the flow of excessive pressure producing material from the mold cavity S². The overflow edge is constructed somewhat along the lines of the cut off edge in flash type compression molding.

The instant the material is compressed in the mold cavity U the motion stops in orifices M, P and V, plunger I is reversed, the superheating block O together with the mold is withdrawn and the material in the orifice P of the superheating block is set sufficiently to maintain the material under pressure within the mold cavity U. In the next cycle, as soon as superheating block O returns again in operative coincidence with the orifice M of the pressure chamber, the material in the orifice M is at that instant again in motion. This is stated here to stress the fact that the superheating block remains in position against the orifice M only during the time that material is being forced into the mold cavity. This is done so that due to the high temperatures, the material does not set in orifice M due to superheating. This also provides the possibility of breaking the material at the junction of the pressure chamber and superheating block, as indicated in Fig. 3. In Fig. 3 the material previously remaining within orifices V and P is fragilely connected to the gate of the molded part W, whereby separation is readily made at this point.

The pressure superheating block while mounted on the mold at a considerable distance from the mold cavity, may be mounted partially within the mold block by removing portions of the metal of the mold block, whereby the superheating block is brought into closer proximity thereto.

The heating of the apparatus can be of any type, hot water, atmospheric steam, steam at required pressures, hot oil, but preferably the heating would be done electrically, except perhaps the heating of the superheating block section adjacent to the pressure chamber orifice, which could most desirably be heated by means of hot water or atmospheric steam, so as to absorb and remove excess heat rapidly. The same is true likewise of the heating of the pressure chamber casing. The mold and the conveyor if heated by steam would be heated to a temperature of approximately 330° to 350° F. Certain materials which will not stand a high mold temperature would call for a lower steam pressure, as for example urea molding compounds, which are likely to discolor seriously at temperatures above 280° F.

The pressure chamber may require heat only at the very beginning to bring the pressure chamber to the same temperature as the molding composition, and if properly insulated against heat loss can be operated advantageously without any heat. That is, the operation calls for the maintenance of the temperature of the preheated pulverized material to maintain plasticity in the pressure chamber.

The various parts of the apparatus should be heat insulated. A cover should be used over the pressure chamber hopper. Various thermocouples should be inserted at points of required temperature information, such as at the discharge point of the conveyor, the extrusion chamber hopper, the extrusion cylinder, the various sections of the superheating block and closely adjacent to the mold cavity itself. These, in the well known manner, to be connected with recording and automatic temperature control devices.

By thermosetting molding compositions I mean to include ready-to-use molding compositions, or combinations of filler, fibre, plasticizer and resinous binder, thoroughly intermixed, to function as a molding composition; or, for that matter, the resinous components themselves, and becoming more rigid through polymerization or chemical reaction so they may be ejected from the hot mold without cooling. The usual types of thermosetting materials are already well known and are represented by a large class of phenol-aldehyde resins and similar resins of natural derivation, such as gum accroides, containing reactive phenolic (OH) groups, also various resins made from natural vegetable growth phenolic bodies such as obtained from the group of trees known as Anacardiaceae, such as exemplified by cashew nut shell oil, Japanese lacquer, etc. In addition to the many phenolic resins, resins of the urea type and of a thermosetting nature are included, likewise, the more reactive types of thermosetting alkyd resins, such for example as the glycol-maleic ester copolymerized with styrol or methacrylate resin or polymers. The glycol-maleic ester when used alone without being alloyed with other mutually compatible resins is of itself moldable and offers extreme speeds in moldability. However, great precautions are necessary as to temperature used in plasticizing, injection and curing as the velocity of cure may become almost explosive. My method and apparatus offers an ideal use for the regulation of these conditions of plasticizing and molding but temperature tolerance and operating conditions must be carefully ascertained and maintained. Products of the thermosetting type of resinous compositions offer full utility of my apparatus and method.

Various temperatures were given for the superheating of the molding compound in the orifice P of the superheating block O. When using most phenol-aldehyde resins and the special cashew nut shell oil resin, Durite S-2208, this temperature has been found experimentally to be most suitable at about 400° F. These are materials with woodflour fillers. Where other fillers are used and material of high decomposition temperature tolerance are used, the higher temperature may be required, depending upon speed of operation and reactivity of the material.

In the design of the superheating block O it should be considered that this block would be heated at from approximately 600° to 1000° F. and that the heat must be given off rapidly.

Therefore it is desirable that this block be made of a metal of large cross sectional area, relatively to the size of the channel for superheating, and be of such character as to be efficient in heat transmission, and preferably on the outside should be heat insulated. It is not essential that all of the contacting surface be in contact with the end of the pressure chamber K. As the material travels through orifice P at high velocity and must take on a superheat of from 200 to 300° F. ordinarily, the metal of this superheating block should be an efficient conductor of heat. The orifice P should be long lasting and therefore a plating or lining of this orifice P with a more wear-resisting or harder material of almost equal heat conductivity is advised, such, as for example, iridium.

In the pressure chamber a high unit pressure on the plunger I—J is to be preferred to any increased temperature in the pressure chamber. This pressure indicated in the given example to be about 10,000 lbs./sq. in., may be anywhere from 10,000 to 50,000 lbs./sq. in.

The practice of the method of my present invention and the use of the apparatus employed therewith will be fully apparent from the above-detailed description thereof. The essential features of the same may be here briefly summarized.

The thermosetting materials are plasticized in a thin granular stream. In this step of the method, the individual particles receive equal heat treatment as they are fed over the conveyor which delivers the material in a relatively thin stream and in a granular or powdery condition to the pressure chamber. The thus delivered material is homogeneously plasticized by heat to a definite temperature. The material brought up to the plasticizing point is maintained in the preheated, preplasticized condition in the pressure chamber. No further heat is supplied to this plasticized material in the pressure chamber, the pressure chamber being heated if necessary to merely maintain the temperature conditions of this plasticized material delivered thereinto. Therefore, at this stage of the process the present invention advances a new practice in the molding of thermosetting materials, in that complete and sufficient plasticization by heat is given the granular or pulverized resinous material before pressure is applied. This plasticizing to the full plasticity required for complete flow separates the function of heating from the function of pressure. As stated, no further heating is given to the preplasticized material in the pressure chamber. It is important to note that by plasticizing the individual granules or particles in the high frequency vibrator conveyor treatment, a uniformity of heating is obtained which could not possibly be produced by heating a thick cross-section or a mass of material. There is, therefore, produced a heating uniformly of individual particles while in motion, each particle uniformly exposed to the source of heat, the volume of such particles being fed at a measured out rate, preferably while so being heated, to meet the requirements of the next step in the process and the apparatus used therefor, namely, the application of pressure in the pressure chamber.

The high pressure applied to the preheated now plasticized material, which latter is maintained at its acquired temperature, causes the material which now becomes fluid to flow into and through the orifice of the superheating block, and thence into the mold cavity. The operation of the pressure chamber thus fluidizes the material, causing the same to flow through the orifices and into and to fill the mold cavity or cavities. It is during this fluid transit that the material is superheated by flowing through the superheating block.

The superheating block functions to elevate the temperature of the fluidized material which is being forced through it to a point of superheating, whereby the material can subsequently be set by the heat which is absorbed by the material and by the exothermic reaction heat which is brought about by this superheating treatment. This heating of the fluidized material to a degree sufficiently high and yet below its point of decomposition, by the use of the superheating block and the movement of the material through a small orifice, with this superheating block heated to a temperature substantially higher than the temperature of the mold, and then rapidly forcing this superheated material into the mold cavity where the material is formed and the finish of the mold is reproduced, is the next essential feature of the process. It should be noted that this superheating of the material in a relatively thin stream through the superheating block, eliminates to a very large extent any gases which would be engendered during the major part of the exothermic reaction, since the reaction is already well on its way when the material enters the mold cavity.

As soon as the molded piece is given finish and form in the mold cavity, by effecting a cure of the external surface or layer of the molded product, it is ejected from the mold into a suitable container for further curing. Thus no curing of the interior of the molded piece takes place in the mold. For this purpose, the temperature of the mold is substantially lower than the temperature of the superheating block, and while the mold cavity is heated at the lower temperature, the temperature is high enough to promote continuing reaction.

The thus molded piece, after ejection from the mold, continues to react under the influences of the heat retained in the body thereof until final cure is effected.

While I have shown the preferred steps of carrying out the process and while I have illustrated an example of apparatus to be used therewith, and while I have given some examples of materials, temperatures and modes of treatment, it will be understood that these were given only by way of illustration and not by way of limitation. It will be obvious that many changes may be made in the step sequence and in the operation of the apparatus, and in the constructional design of the equipment, without departing from the spirit of the invention defined in the following claims.

In the following claims, the expressions "superheating" and "superheated" shall be understood to mean heating or heated to temperatures above the temperature at which the thermosetting material will cure.

I claim:

1. The ejection method of molding thermosetting materials which consist in heat plasticizing the material, in forcing the heat plasticized material through a superheating zone and thereby fluidizing and superheating the material, in filling a mold with the fluidized and superheated material to give form and finish thereto, in ejecting the formed but interiorly uncured piece from the mold, and allowing the molded piece to cure by means of its superheating acquired stored up heat to the insoluble infusible state after ejection from the mold.

2. The injection method of molding thermosetting materials which are exothermic in their curing reaction which consists in heat plasticizing the material, in forcing the heat plasticized material through a superheating zone and thereby fluidizing and superheating the material, the material as it passes through the superheating zone acquiring a temperature sufficiently high so that an exothermic reaction ensues, in filling a mold with the fluidized and superheated material to give form and finish thereto, in ejecting the formed but interiorly uncured piece from the mold, the ejected molded piece containing sufficient stored up heat acquired upon passage through the superheating zone to enable curing to the infusible insoluble state to take place, and allowing the molded piece to cure after being ejected from the mold.

3. The injection method of molding thermosetting materials relatively solid and granular at ordinary temperatures which consists in heat plasticizing the material while maintaining the same in a granular condition, in forcing the thus heat plasticized material under pressure through a superheating zone and thereby fluidizing and superheating the material in filling a mold with the fluidized and superheated material to give form and finish thereto, in ejecting the formed but interiorly uncured and still thermoplastic piece from the mold, and allowing the molded piece to cure to the infusible insoluble state after ejection from the mold.

4. The injection method of molding thermosetting materials which consists in heat plasticizing the material, in forcing the heat plasticized material through a superheating zone and thereby fluidizing and superheating the material, the material as it passes through the superheating zone acquiring a relatively high temperature, in filling a mold with the fluidized and superheated material to give form and finish thereto, the molded piece containing sufficient stored up heat acquired upon passage of the material through the superheating zone to enable curing to take place, and allowing the molded piece to cure after being ejected from the mold.

5. The injection method of molding thermosetting materials relatively solid and granular at ordinary temperatures which consists in heat plasticizing the material while moving the same in a thin layer and maintaining the same in a granular condition, in forcing the thus heat plasticized material through a superheating zone and thereby fluidizing and superheating the material, in filling a mold with the fluidized and superheated material to give form and finish thereto, and in ejecting the formed but interiorly uncured and still thermoplastic piece from the mold, and allowing the molded piece to cure to the infusible insoluble state after ejection from the mold.

6. In the injection method of molding thermosetting materials, the steps which consist in forcing a heat plasticized thermosetting material through a superheating zone and thereby fluidizing and superheating the material, in filling a mold with the fluidized and superheated material to give form and finish thereto, the molded piece containing sufficient stored up heat acquired upon passage of the material through the superheating zone to enable curing of the molded piece to take place, and allowing the molded piece to cure after being ejected from the mold.

7. In the injection method of molding thermosetting materials which are exothermic in their curing reaction, the steps which consist in forcing a heat plasticized thermosetting material through a superheating zone and thereby fluidizing and superheating the material, the material as it passes through the superheating zone acquiring a temperature sufficiently high so that an exothermic reaction ensues, in filling a mold with the fluidized and superheated material to give form and finish thereto, the molded piece containing sufficient stored up heat acquired upon passage of the material through the superheating zone to enable curing of the molded piece to take place, and allowing the molded piece to cure after being ejected from the mold.

8. In the injection method of molding thermosetting materials, the steps which consist in forcing a heat plasticized thermosetting material through a superheating zone and thereby fluidizing and superheating the material, in filling a mold with the fluidized and superheated material to give form and finish thereto, in ejecting the formed but interiorly uncured piece from the mold, the molded piece containing sufficient stored up heat acquired upon passage of the material through the superheating zone to enable curing of the molded piece to take place, and allowing the molded piece to cure after being ejected from the mold.

9. In the injection method of molding thermosetting materials relatively solid at ordinary temperatures, the steps which consist in forcing a thermosetting material through a superheating zone and thereby fluidizing and superheating the material, in filling a mold with the fluidized and superheated material to give form and finish thereto, in ejecting the formed but interiorly uncured piece from the mold, the molded piece containing sufficient stored up heat acquired upon passage of the material through the superheating zone to enable curing of a molded piece to subsequently take place and allowing the molded piece to cure after being ejected from the mold.

10. In the injection method of molding thermosetting materials relatively solid at ordinary temperatures, the steps which consist in forcing a thermosetting material which is exothermic in its curing reaction through a superheating zone and thereby fluidizing and superheating the material, in filling a mold with the fluidized and superheated material to give form and finish thereto, the material as it passes through the superheating zone acquiring a temperature sufficiently high so that an exothermic reaction ensues, in ejecting the formed but interiorly uncured piece from the mold, the molded piece containing sufficient stored up heat acquired upon passage of the material through the superheating zone to enable curing of a molded piece to subsequently take place, and allowing the molded piece to cure after being ejected from the mold.

11. In the injection method of molding thermosetting materials relatively solid at ordinary temperatures, the steps which consist in forcing a thermosetting material through a superheating zone and thereby fluidizing and superheating the material, in filling a heated mold with the fluidized and superheated material to give form and finish thereto, the heated mold being held at a temperature substantially below that of the superheating zone, in ejecting the formed but interiorly uncured piece from the mold, the molded piece containing sufficient stored up heat acquired upon passage of the material through the superheating zone to enable curing of a molded piece to subsequently take place, and allowing the molded piece to cure after being ejected from the mold.

12. In the method of molding thermosetting materials relatively solid and granular at ordinary temperatures the steps which consist in heat plasticizing the thermosetting material while moving the same in a thin layer at such a speed as to prevent any substantial advancement of the thermosetting material and maintaining the same in a granular and particle flowing condition, and in then applying pressure without further heat to the thus plasticized granular material to fluidize the same.

13. In the method of molding thermosetting materials relatively solid and granular at ordinary temperatures the steps which consist in feeding the thermosetting material in a thin layer over a conveyor vibrated at high frequency, the said material being fed at such a speed as to prevent any substantial advancement thereof, in heat plasticizing the material as it is fed over the conveyor while maintaining the material in a granular and particle flowing condition, and in then applying pressure without further heat to the thus plasticized granular material to fluidize the same.

14. In the method of molding thermosetting materials relatively solid and granular at ordinary temperatures the steps which consist in feeding the thermosetting material in a thin layer over a conveyor, the said material being fed at such a speed as to prevent any substantial advancement thereof, in heat plasticizing the material as it is fed over the conveyor while maintaining the material in a granular and particle flowing condition, in delivering the plasticized granular material to a pressure chamber, and in promptly applying pressure therein without further heat to the thus plasticized granular material to fluidize the same.

15. In the method of molding thermosetting materials relatively solid and granular at ordinary temperatures the steps which consist in heat plasticizing the material while maintaining the same in a granular and particle flowing condition, in then applying pressure without further heat to the thus plasticized granular material to fluidize the same, and in then forcing the fluidized material through a superheating zone.

16. In an injection method of molding thermosetting materials, the steps of forcing a superheated and fluidized thermosetting material into a heated mold cavity held at temperatures substantially below the superheated material, the material being given form and finish by the mold, and in quickly ejecting the formed but interiorly uncured and hot molded piece from the mold, the superheat in the material and molded piece being sufficient for curing the piece, and allowing the molded piece to cure after being ejected from the mold.

EMIL E. NOVOTNY.